(12) United States Patent
Moller et al.

(10) Patent No.: US 10,543,625 B2
(45) Date of Patent: Jan. 28, 2020

(54) METHOD AND DEVICE FOR CASTING A RING-SHAPED PLASTIC FRAME IN A RECESS OF A ROTOR DISK OF A DOUBLE-SIDED MACHINING MACHINE

(71) Applicant: Lapmaster Wolters GmbH, Rendsburg (DE)

(72) Inventors: Helge Moller, Flensburg (DE); Jurgen Kanzow, Kiel (DE)

(73) Assignee: Lapmaster Wolters GmbH, Rendsburg (DE)

( * ) Notice: Subject to any disclaimer, the term of this patent is extended or adjusted under 35 U.S.C. 154(b) by 282 days.

(21) Appl. No.: 15/223,702

(22) Filed: Jul. 29, 2016

(65) Prior Publication Data

US 2017/0028596 A1 Feb. 2, 2017

(30) Foreign Application Priority Data

Jul. 30, 2015 (DE) .................. 10 2015 112 527

(51) Int. Cl.
*B29C 39/10* (2006.01)
*B29C 39/38* (2006.01)
(Continued)

(52) U.S. Cl.
CPC .......... *B29C 39/265* (2013.01); *B29C 33/306* (2013.01); *B29C 39/10* (2013.01);
(Continued)

(58) Field of Classification Search
CPC ....... B29C 39/38; B29C 39/10; B29C 39/265; B29C 45/14; B29C 45/14336; B29C 39/306; B29C 39/26; B29C 45/1418
See application file for complete search history.

(56) References Cited

U.S. PATENT DOCUMENTS 3,694,124 A * 9/1972 Saumsiegle ............. B29C 49/06
425/533
4,779,835 A * 10/1988 Fukushima ......... B29C 45/1744
249/161
(Continued)

FOREIGN PATENT DOCUMENTS

DE       232877 A1     12/1984
DE     10228441 B4      1/2003
(Continued)

OTHER PUBLICATIONS

JP 2017030354; published Feb. 9, 2017; Search Report dated Apr. 18, 2018; 11 pages.

*Primary Examiner* — Nahida Sultana
*Assistant Examiner* — Debjani Roy
(74) *Attorney, Agent, or Firm* — Barclay Damon LLP

(57) ABSTRACT

The invention relates to a device for casting a ring-shaped plastic frame. The device includes a first mold part and a second mold part, a rotor having at least one recess, and a mold core. The mold core includes at least one casting channel configured to connect to a supply one end. The mold parts may also include at least one mold insert. The mold volume is at least partially defined by the at least one mold insert, the at least one recess of the rotor, and the mold core. The mold volume is fluidly connected to the other end of the at least one casting channel.

6 Claims, 4 Drawing Sheets

(51) Int. Cl.
  *B29C 39/08* (2006.01)
  *B29C 39/26* (2006.01)
  *B29C 33/30* (2006.01)
  *B29K 705/00* (2006.01)
  *B29L 31/34* (2006.01)

(52) U.S. Cl.
  CPC .......... *B29C 39/38* (2013.01); *B29K 2705/00* (2013.01); *B29L 2031/3481* (2013.01)

(56) References Cited

U.S. PATENT DOCUMENTS

| | | | |
|---|---|---|---|
| 4,881,884 A * | 11/1989 | De'Ath | B29C 45/14065 425/117 |
| 6,527,989 B1 * | 3/2003 | Onoda | B29C 45/14065 174/60 |
| 2003/0010887 A1 | 1/2003 | Potempka | |
| 2010/0117262 A1 | 5/2010 | Gringer | |
| 2014/0377395 A1 * | 12/2014 | Lin | B29C 45/78 425/170 |

FOREIGN PATENT DOCUMENTS

| | | |
|---|---|---|
| DE | 102007029907 A1 | 1/2009 |
| DE | 102010044223 A1 | 8/2011 |
| JP | 2005140140 A | 6/2005 |
| JP | 2009154338 A | 7/2009 |
| WO | 0174572 A2 | 10/2001 |

* cited by examiner

METHOD AND DEVICE FOR CASTING A RING-SHAPED PLASTIC FRAME IN A RECESS OF A ROTOR DISK OF A DOUBLE-SIDED MACHINING MACHINE

CROSS REFERENCE TO RELATED APPLICATION

This application is based upon and claims priority to German Patent Application No. 10 2015 112 527.7, filed Jul. 30, 2015, under relevant sections of 35 USC § 119, the entire contents of which are hereby incorporated by reference.

BACKGROUND OF THE INVENTION

The invention relates to a device for casting a ring-shaped plastic frame in a recess or annular recess of a rotor disk of a double-sided machining machine, The recess serves to hold a workpiece in the double-sided machining machine during the double-sided machining process. The device comprises two mold parts that accommodate the rotor disk between themselves, and a mold core that partially fills in the recess when the rotor disk is accommodated between the mold parts, wherein the mold core has at least one casting channel. One end of the mold terminates in a mold volume provided for the plastic frame and the other end is connectable to a supply for plastified plastic. The invention also relates to a corresponding method. Finally, the invention relates to a rotor disk of a double-sided machining machine.

A double-sided rotor disk is known for example from DE 102 28 441 B4. The rotor disks generally have a plurality of recesses in which workpieces, in particular semiconductor wafers, are held floating during machining in the double-sided machining machine. Suitable kinematics cause the rotor disks to move between the working gap formed between the machining disks such that they describe cycloid paths through the working gap in the semiconductor wafers held in the recesses of the rotor disks. The rotor disks normally consist of wear-resistant materials such as metal. To keep the semiconductor wafers from being damaged, the edge of the recesses of the rotor disks is normally provided with a plastic frame which is cast in the contour edge of the rotor disks in a casting procedure, such as a plastic injection molding procedure.

Extremely high demands are placed upon the dimensions of the semiconductor disks, such as silicon wafers, to be generated. These dimensions are significantly influenced by the consumable materials used during machining. For example in the case of double-sided polishing, be it abrasive polishing or haze-free polishing, the tolerances for global parallelism (GBIR), local flatness (SFQR), edge flatness (ESQFR) and the curvature of the top and bottom side of the wafer at the semiconductor edge (ZDD) are becoming increasingly smaller. The rotor disks and in particular the plastic frames play a decisive role since they influence the interaction between a polishing cloth applied to the working disks and the wafer edge. The plastic frame interacts with the polishing cloth depending on its thickness with reference to the semiconductor thickness, which in turn influences the polishing pressure at the edge of the wafer. For example, strong polishing cloth compression due to the plastic frame yields weak pressure by the polishing cloth on the wafer edge and vice versa.

For specific workpiece dimensions, in particular at the workpiece edge, the precise arrangement and dimensions of the plastic frame are highly important. With the known method, critical parameters such as the alignment of the plastic frame relative to the rotor disk main body, and hence a specific step height between the rotor disk and plastic frame, cannot be controlled in the desired manner. This can produce axially asymmetrical plastic frames with reference to the rotor disk. This in turn causes an uneven curvature of the semiconductor wafer edges after machining and hence an impairment of the local flatness. A spread of the frame dimensions, in particular the frame thickness occurring in known methods for producing plastic frames yield undesirable deviations in the dimensions of the semiconductor wafers machined in the machine. During the known casting methods, deviations in dimensions arise, for example due to the shrinkage of the material used and the parameters used in the casting method.

BRIEF SUMMARY OF THE INVENTION

On the basis of the explained prior art, the object of the invention is to provide a device, method and a rotor disk of the above-cited type, wherein the dimensions and arrangement of the plastic frame in the recesses of the rotor disks, and hence the machining results of the workpieces machined with the rotor disks, can be precisely controlled in a flexible manner.

For a device for the aforementioned type, the invention achieves the object in that least one of the mold parts has at least one annular pocket or ring-shaped seat in which at least one ring-shaped mold insert is releasably inserted such that the at least one ring-shaped mold insert, together with the mold core and the edge of the recess, delimits the mold volume provided for the plastic frame.

The invention furthermore achieves the object by a method for casting a ring-shaped plastic frame in a recess of a rotor disk of a double-sided machining machine, wherein the recess serves to hold a workpiece during double-sided machining in the double-sided machining machine, as described in the following steps.

A rotor disk is accommodated between two mold parts, and the recess is partially filled with a mold core while the rotor disk is accommodated between the mold parts, wherein the mold core has a least one casting channel, one end of which terminates in a mold volume provided for the plastic frame, and the other end of which is connectable to a supply for plastified plastic, at least one ring-shaped mold insert of at least one of the mold parts is releasably inserted into at least one ring-shaped seat of at least one of the mold parts such that the at least one ring-shaped mold insert, together with the mold core and the edge of the recess, delimits the mold volume provided for the plastic frame. The plastified plastic from the supply is then cast in the mold volume provided for the plastic frame through the at least one casting channel of the mold core. Once sufficient stability of the shape of the cast plastic is achieved, the rotor disk is removed along with the plastic frame cast in the recess.

The rotor disks can, for example, consist of a metal material. However in another embodiment, a plastic material is also conceivable. The rotor disk possesses at least one, but generally a plurality, of recesses, in which workpieces such as semiconductor wafers are held floating during double-sided machining, for example double-sided polishing. As mentioned above, the rotor disks move while rotating during double-sided machining through the working gap between the working disks of the double-sided machining machine such that the workpieces to be machined describe cycloid paths through the working gap. The work piece such as semiconductor wafers and the recesses in the rotor disk provided for the semiconductor wafers can for example be circular. The plastic frame cast in the recess can be correspondingly ring-shaped and is injected onto the inner surface of the rotor disk delimiting the recess in a molding method such as a plastic injection molding method. However, other molding methods are also conceivable with the invention such as centrifugal casting methods.

According to the invention, the rotor disk is in particular clamped between the mold parts. The mold parts can be mold plates. In particular, the mold parts can be mold halves. More than two mold parts can also be provided. The inner surface of the rotor disk delimiting the recess, the mold inserts, or respectively the ring-shaped mold inserts and the mold core, delimit the mold cavity forming the plastic frame. Plastified plastic is cast, such as injected, into this mold cavity. For this purpose, the mold core has at least one casting channel, one end of which is connected to a supply for a molten plastic such as from an extruder, and the other end of which is connected to the mold cavity. The mold core can in particular possess a plurality of such casting channels. Of course, a plurality of such mold cores can also be provided.

At least one of the mold parts has at least one ring-shaped seat in which the at least one ring-shaped mold insert is releasably inserted. Together with the mold core and the edge of the recess, the at least one ring-shaped mold insert delimits the mold volume provided for the plastic frame. The at least one mold insert can for example be screwed to the least one mold part. However, other types of fastening are also possible. The mold inserts as well as the mold parts can also consist for example of a metal material. They can possess a surface roughness adapted to the plastic material to be cast to prevent adhesion of the molten material.

The mold inserts according to the invention in the mold allow the position and dimensions to be precisely controlled in a flexible manner, in particular the thickness, of the cast plastic frame in comparison to the main body of the rotor disk. By means of the mold inserts according to the invention, the position of the plastic frame can be adjusted within a range of, for example, +/−20 µm relative to the top, or respectively bottom of the rotor disks. This results in possible differences in thickness between the plastic frame and rotor disk main body of for example −40 µm to +40 µm. Fluctuations in the thickness values of the cast plastic frame can be minimized by the ring-shaped mold inserts according to the invention. A specific plastic frame thickness can be reliably adjusted in a flexible manner. The same holds true for the step dimensions between the plastic frame and the main body of the rotor disk. Given the specific adjustment of the plastic frame dimensions and arrangement according to the invention, a low injection pressure in the plastic injection molding method and a homogeneous crystalline structure of the plastic, the plastic frame dimensions can be optimally harmonized with requirements of the double-sided machining, in particular the double-sided polishing process. By using rotor disks with plastic frames produced according to the invention, workpieces, in particular semiconductor wafers, can be produced with optimum dimensions which in particular also holds true for the edge of the workpieces. For example, the spread of the thickness of the plastic frame can, for example, be limited to ±5 µm, preferably ±2 µm, more preferably ±1 µm with the method according to the invention, or respectively the device according to the invention.

According to one embodiment, the mold parts can each have at least one ring-shaped seat in which at least one ring-shaped mold insert is releasably inserted such that the ring-shaped mold inserts together with the mold core and the edge of the recess delimit the mold volume provided for the plastic frame. In this embodiment, the plastic frame is formed on both sides by mold inserts releasably attached within the mold parts to increase flexibility and precision.

According to another embodiment, the device can comprise a plurality of differently dimensioned ring-shaped mold inserts that optionally are releasably insertable into the at least one ring-shaped seat such that differently dimensioned mold volumes for plastic frames can be generated by inserting differently dimensioned ring-shaped mold inserts. This further improves the flexibility. With only one mold, different plastic frame dimensions can be realized by exchanging the ring-shaped mold inserts.

According to one embodiment, the mold volume that is delimited by the at least one ring-shaped mold insert together with the mold core and the edge of the recess and is provided for the plastic frame can possess a longer extension than the rotor disk in the axial direction of the recess. By means of this embodiment, a plastic frame can be formed with the same thickness as the rotor disk despite the unavoidable shrinkage during the cooling and hardening of the plastic.

According to another embodiment, the mold volume provided for the plastic frame can have one or more cavities for feeders. Feeders or respectively risers are then formed in the produced plastic frame that counteract the formation of cavities during the hardening process.

According to another embodiment, a heating device can be provided by means of which the at least one casting channel is heated. The use of such a heated channel produces an even temperature in the molten plastic, and the flow paths can be kept short. In addition, the injection pressure can thereby be reduced to ensure optimum molding of the precise mold dimensions and in particular a homogeneous crystallization of the thermoplastic material. Homogeneous crystallization yields greater dimensional stability of the produced plastic frame.

The optimum casting geometry with sufficient areas for venting the mold and a regular arrangement of feeders further simplifies the minimization of the injection and holding pressure.

The method according to the invention can be performed by the device according to the invention. Accordingly, the device according to the invention can be suitable to perform the method according to the invention.

The invention furthermore relates to a rotor disk of a double-sided machining machine with at least one recess, and at least one ring-shaped plastic frame cast in the at least one recess using the method according to the invention. The rotor disk can in particular be a rotor disk for a double-sided polishing machine.

For example, the thermoplastic materials cited in the following table are materials that can be used according to the invention for the plastic frame, wherein the left column lists unfilled materials, and the right column lists material that are filled, or respectively provided with a fiber component:

| Thermoplastic materials | |
| --- | --- |
| Unfilled | Filled |
| PEEK | PPS GF 40 |
| PTFE | PA 66 GF 50 |
| PFA | PA 66 GF 25 |
| PA 66 | PBT GF 50 |
| PET | PBT GF 30 |
| PBT | PES GF 30 |

-continued

Thermoplastic materials

| Unfilled | Filled |
|---|---|
| PES | PES GF 20 |
| PA 6 | PA6 GF 50 |
| PEI | PA6 GF 25 |
| PPSU | PEI GF 30 |
| PSU | PSU GF 30 |
| PA 12 | PSU GF 20 |
| PVDF | PA 12 GF 30 |
| POM-H | PVDF GF 10 |
| PP-H | PP GF 40 LF |
| PPO | PP GF 30 |
| PC | PP GF 20 |
| PE-HD | POM GF 25 |
| PE-UHMW | PC GF 30 |
| PC + ABS | PC GF 10 V0 |
| ABS | PPO GF20 |
| PE-LD | PC + ABS GF 20 |
| PMMA | SAN GF 35 |
| SAN | ABS GF17 |
| PS | |

BRIEF DESCRIPTION OF THE DRAWINGS

In the following, the invention is explained in more detail with reference to the figures. Schematically.

DETAILED DESCRIPTION OF THE INVENTION

Figure 1:
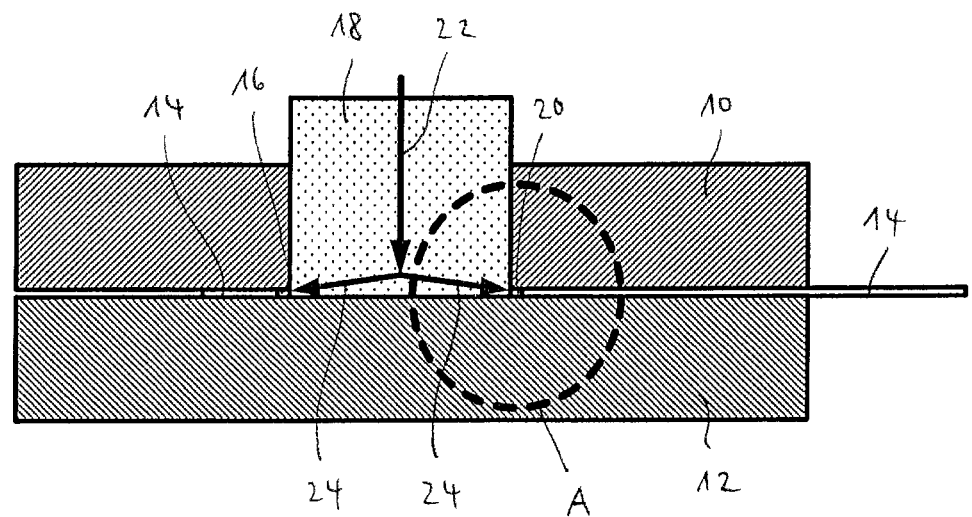
FIG. 1 shows a sectional view of an embodiment of the casting device.

If not otherwise specified, the same reference numbers indicate the same objects in the figures. The device shown in FIG. 1 has a first mold part 10, in particular a first mold half, and a second mold part 12, in particular a second mold half. A rotor disk 14 of a double-sided machining machine, in particular a double-sided polishing machine, is clamped between the mold parts 10, 12 and accordingly held. The rotor disk 14 possesses a plurality of for example circular recesses 16 of which one can be seen in FIG. 1. During operation, e.g. circular semiconductor wafers such as silicon wafers are held floating in the recesses 16 to be machined in a double-sided machining machine. The device shown in FIG. 1 furthermore has a mold core 18 which is inserted in the recess 16 and fills it up to a mold cavity 20. In one embodiment, the mold cavity 20 is ring-shaped. Reference signs 22, 24 schematically indicate casting channels formed in the mold core 18 in FIG. 1. At its top end in FIG. 1, the central casting channel 22 is connected to a supply (not shown) for molten plastic such as an extruder. The casting channels 24 connected to the central casting channel 22 terminate in the mold cavity 20. During operation, the molten plastic is conducted from the supply through the casting channels 22, 24 into the mold cavity 20 as indicated by the arrows in FIG. 1.

Figure 2:
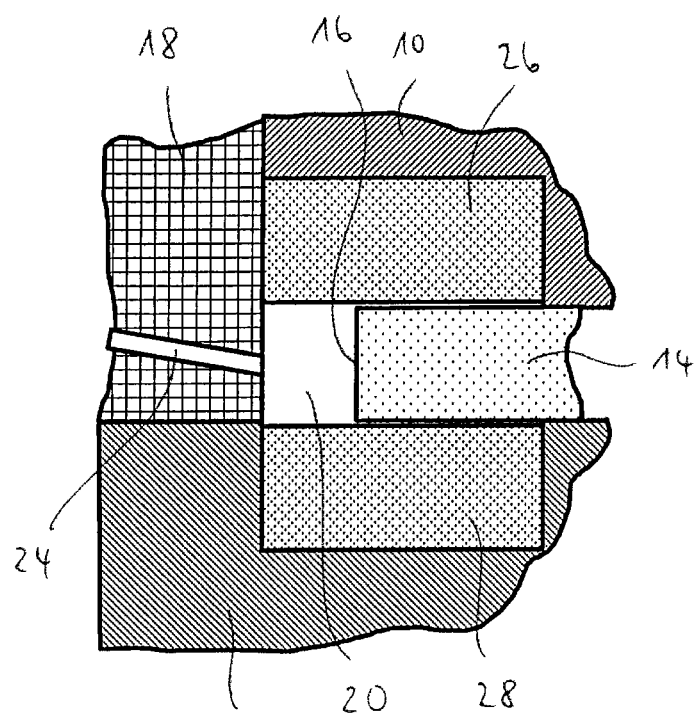
FIG. 2 shows a sectional enlargement of a region of an embodiment of the casting device in a first operating state schematically portrayed at A in FIG. 1.

In FIG. 2, it can be seen that in the device according to the invention, the mold parts 10, 12 each have a ring-shaped pocket, such as a circular ring-shaped seat, wherein a ring-shaped component, such as a circular ring-shaped mold insert 26, 28 is releasably inserted into the ring-shaped seat. The mold inserts 26, 28 can for example be screwed to the mold parts 10, 12. As can be seen in FIG. 2, the mold cavity 20, which is also ring-shaped, e.g. circular ring shaped, is delimited by the mold core 18, the inner edge of the rotor disk 14 forming the recess 16 and the insides of the annular ring-shaped mold inserts 26, 28. This mold cavity 20 forms the mold volume provided for the plastic frame to be cast in the rotor disk 14.

Figure 3:
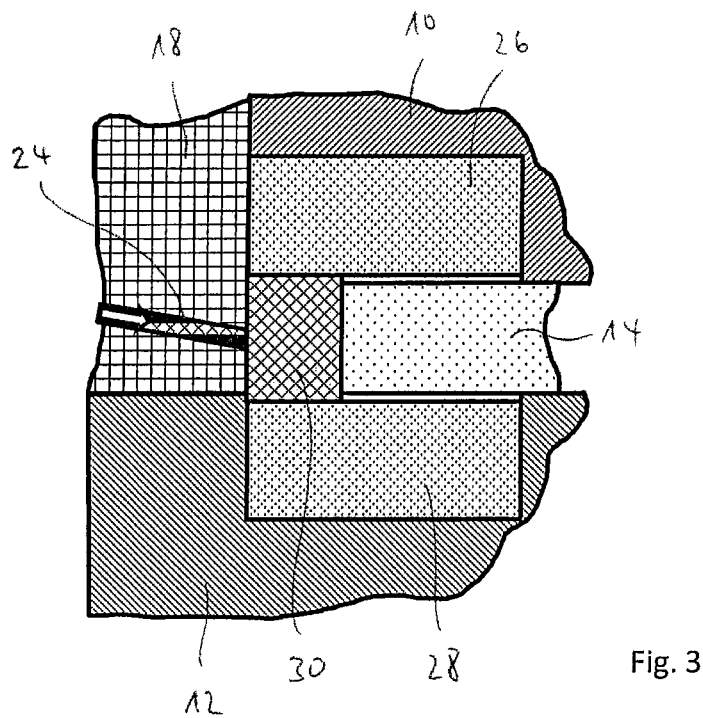
FIG. 3 shows the casting device of FIG. 2 in second operating state.
Figure 4:
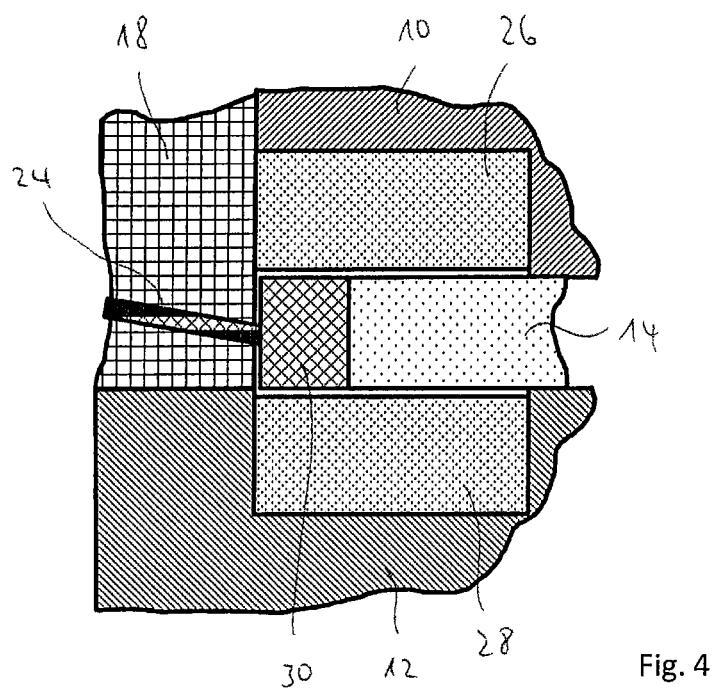
FIG. 4 shows the casting device of FIG. 2 in a third operating state.

FIG. 3 depicts the operating state shortly after casting still meltable plastic 30 through the mold channels 22, 24 in the mold cavity 20. It can clearly be seen in FIGS. 2 and 3 that the mold cavity 20 provided for the plastic frame possesses a longer extension than the rotor disk 14 in the axial direction of the recess 16, i.e., from bottom to top in FIGS. 2 and 3. Correspondingly, the still flowable plastic material projects slightly above the top and bottom of the rotor disk 14 in FIG. 3. By means of this embodiment, the shrinkage is compensated that occurs while the plastic material cools and dries. FIG. 4 shows the hardened state of the plastic material 30 forming the plastic frame. As can be easily discerned in FIG. 4, the plastic material 30 is flush with the top side and bottom side of the rotor disk 14 in this hardened state. Merely for the sake of completeness, it is noted that the gap which can for example be discerned in FIG. 3 between the top side, or respectively the bottom side of the rotor disk 14 and associated surfaces of the mold inserts 26, 28 is small enough so that the plastified plastic 30 cannot penetrate into this gap due to its viscosity.

Figure 5:
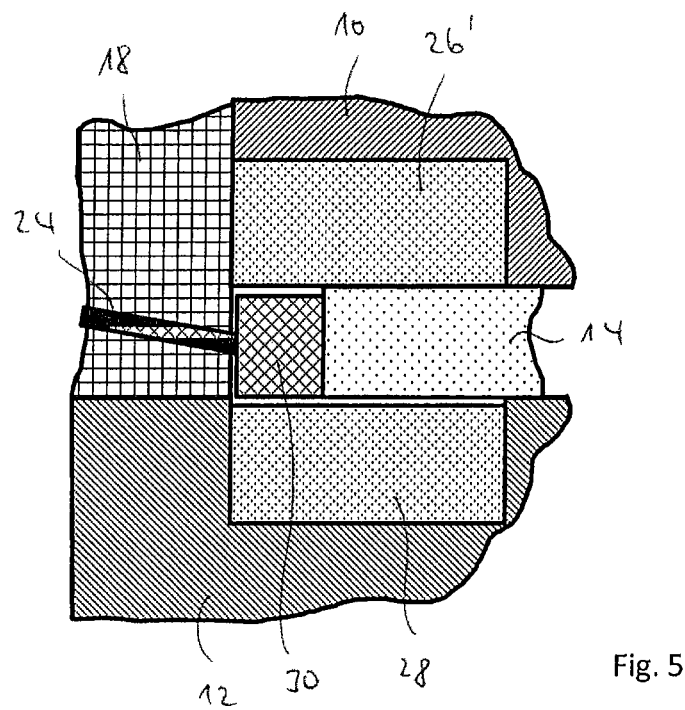
FIG. 5 shows the perspective view from FIG. 4 according to another exemplary embodiment.

The embodiment in FIG. 5 differs from the embodiment shown in FIGS. 2 to 4 such that the ring-shaped mold insert 26' inserted into the top mold part 10 is thicker than the ring-shaped insert 26' shown in FIGS. 2 to 4. FIG. 5 shows the cooled and hardened state of the plastic material 30. In FIG. 5, it can be seen that, due to the greater thickness of the mold insert 26', the hardened plastic 30 does not extend completely up to the top side of the rotor disk 14.

Figure 6:
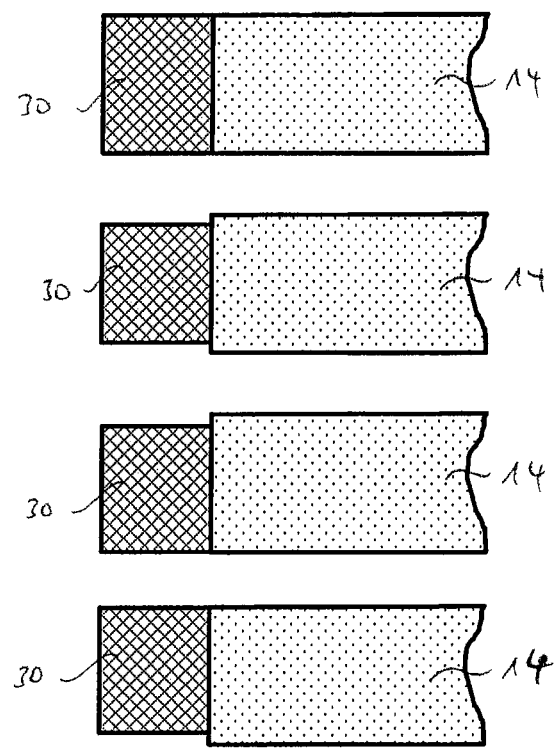
FIG. 6 shows excerpts of sectional views of rotor disks with different plastic frames produced by the method according to the invention.

With the device according to the invention, or respectively the method according to the invention, precise desired dimensions of the plastic frame formed by the plastic material 30 can be flexibly produced by appropriately selecting the respective cast inserts. Different frame geometries that are possible by means of the invention are shown as an example in FIG. 6.

Figure 7:
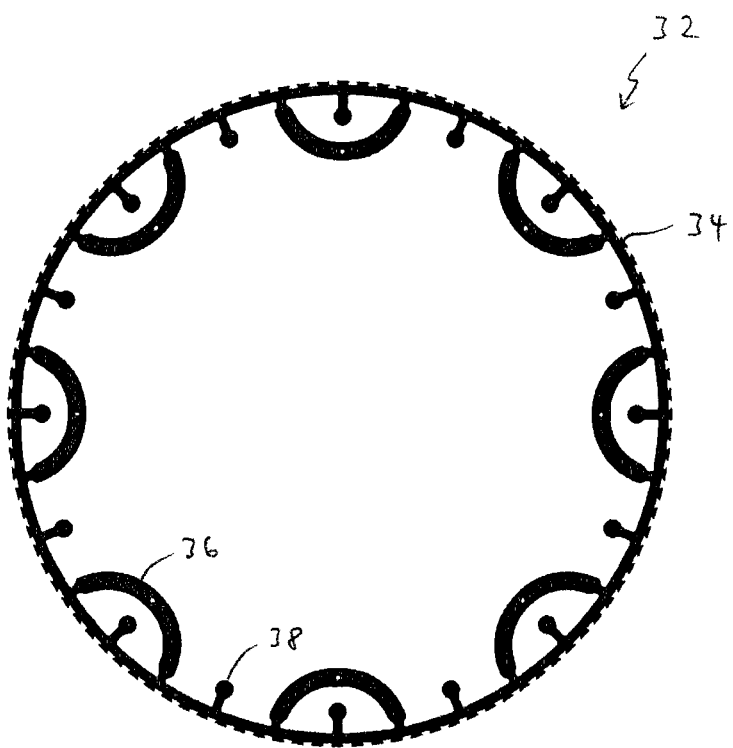
FIG. 7 shows an example of a plastic frame produced using the method according to the invention, or respectively the device according to the invention.

FIG. 7 shows a plastic frame 32 without the rotor disk for reasons of illustration that is produced by means of the method according to the invention, or respectively the device according to the invention. It can be seen that the plastic frame 32 has a dovetailed shape 34 at its outer perimeter which corresponds to a an equivalent dovetailed shape on the inner surface of the recess 16 in the rotor disk 14. At reference signs 36, 38, feeders, or respectively risers can also be seen distributed at regular intervals across the inside of the plastic frame 32 which were generated during the plastic injection molding process. These feeders are removed during the finishing of the plastic frame 32. These are in particular to prevent the formation of cavities during the plastic injection molding process and enable lower injection and holding pressures. This in turn produces more homogeneous crystallization of the plastic material 30 and hence improved shape retention of the plastic frame 32.

By means of the invention, precisely centered plastic frames can be produced in the axial direction of the recesses of the rotor disks. A deviation in thickness in this axial direction can be limited for example to ±5 μm, preferably ±2 μm, and more preferably ±1 μm. This holds true in particular for each location of the plastic frame that is at least 0.5 mm and at most 1 mm distant from an inner edge of the plastic frame. The deviation in thickness of the plastic frame can for example lie within a bandwidth of 10 μm, preferably 4 μm, more preferably 2 μm around a target value, for example for at least 90% of its lateral extension within an area of 0.5 mm to 1 mm from an inner edge.

All of the indicated values are with reference to room temperature and dry rotor disks with plastic frames that have only experienced absorption of water only from normal ambient air.

The invention claimed is:

1. A device for casting a ring-shaped plastic frame into at least one circular recess in a rotor disk adapted to accommodate wafers for machining in a double-sided machining machine, the device comprising:
    a first mold part having at least one annular pocket;
    a second mold part having at least one annular pocket;
    the rotor disk being at least partially disposed between the first mold part and the second mold part;
    a first releasable mold insert disposed within the at least one annular pocket of the first mold part;
    a second releasable mold insert disposed within the at least one annular mold pocket of the second mold part; and
    a mold core having at least one casting channel configured at one end to connect to a supply of casting material, wherein a mold volume is defined by the first releasable mold insert, the second releasable mold insert, the at least one recess of the rotor disk, and the mold core, the mold volume being fluidly connected to the at least one casting channel.

2. The device according to claim 1, wherein the at least one annular pocket of at least one of the first mold part and the second mold part is configured to accommodate a plurality of differently dimensioned releasable mold inserts.

3. The device according to claim 1, wherein the mold volume is at least partially defined by the rotor disk, and wherein the mold volume extends beyond the recess of the rotor disk in an axial direction.

4. The device according to claim 1, wherein the mold volume includes one or more additional cavities configured for feeders.

5. The device according to claim 1, wherein the at least one casting channel is heated.

6. A device for casting a ring-shaped plastic frame comprising:
    a first mold part;
    a second mold part, wherein at least one of the first and second mold parts include an annular pocket;
    a rotor disk disposed between the first mold part and the second mold part, the rotor disk including at least one recess;
    a mold core including at least casting channel configured to connect to a supply;
    at least one mold insert configured to be removeably positioned within the annular pocket; and
    the mold a mold volume at least partially defined by the at least one mold insert, the at least one recess of the rotor disk, and core, the mold volume being fluidly connected to the at least one casting channel.

* * * * *

UNITED STATES PATENT AND TRADEMARK OFFICE
CERTIFICATE OF CORRECTION

| | | |
|---|---|---|
| PATENT NO. | : 10,543,625 B2 | Page 1 of 1 |
| APPLICATION NO. | : 15/223702 | |
| DATED | : January 28, 2020 | |
| INVENTOR(S) | : Helge Moller and Jurgen Kanzow | |

It is certified that error appears in the above-identified patent and that said Letters Patent is hereby corrected as shown below:

In the Claims

Claim 6:
Column 8
Line 27, change "at least casting" to --at least one casting--

Claim 6:
Column 8
Line 31, change "the mold a mold" to --a mold--

Signed and Sealed this
Fifth Day of May, 2020

Andrei Iancu
*Director of the United States Patent and Trademark Office*